United States Patent [19]

Nakamura

[11] Patent Number: 4,528,895
[45] Date of Patent: Jul. 16, 1985

[54] PISTON FOR CYLINDER DEVICE

[75] Inventor: Kaoru Nakamura, Anjo, Japan

[73] Assignee: Aisin Seiki Kabushiki Kaisha, Kariya, Japan

[21] Appl. No.: 478,497

[22] Filed: Mar. 24, 1983

[30] Foreign Application Priority Data

Apr. 6, 1982 [JP] Japan .............................. 57-049838

[51] Int. Cl.³ .............................................. F16J 1/10
[52] U.S. Cl. ....................................... 92/129; 92/248; 60/589
[58] Field of Search ............................ 264/328.9, 161; 425/DIG. 109; 92/248; 60/589; 92/129, 187

[56] References Cited

U.S. PATENT DOCUMENTS 3,622,121 11/1971 Watabe .
3,802,200 4/1974 Kolm .................................... 60/594

FOREIGN PATENT DOCUMENTS

| 39939 | 3/1982 | Japan ................................. 264/161 |
| 2076095 | 11/1981 | United Kingdom ................. 60/589 |
| 2082728 | 3/1982 | United Kingdom ................. 92/248 |

Primary Examiner—Robert E. Garrett
Assistant Examiner—John M. Husar
Attorney, Agent, or Firm—Oblon, Fisher, Spivak, McClelland & Maier

[57] ABSTRACT

A piston for a cylinder device which is formed of fiber glass strengthened resinous material and includes a concave portion, where a plug may remain, formed on an end thereof. The piston is engageable with a push rod and in particular an end surface of the push rod. The concave portion may be formed on approximately the center portion of the end concave surface of the piston and may be of circular configuration. Correspondingly, the concave portion may be formed on a flat surface of the end surface of the piston.

3 Claims, 4 Drawing Figures

PISTON FOR CYLINDER DEVICE

BACKGROUND OF THE INVENTION

1. Field of the Invention

This invention relates to a piston for a cylinder device and more particularly to a piston for a relatively small-sized cylinder device such as a brake or clutch master cylinder for vehicles.

2. Description of the Prior Art

Conventionally, cylinder devices for vehicles such as a brake or clutch master cylinder have been proposed which include a piston slidably received within a cylinder body. The piston and the body are made of resinous material and are molded as a single body to thereby reduce the resultant weight and the cost. After molding, however, a plug remains so as to project from the surface of the piston which is required to have the neat finish and, therefore, the surface of the piston has to be finished smoothly by machining to thereby remove the plug. This means that the cost in manufacturing may increase.

SUMMARY OF THE INVENTION

Therefore, it is an object of the present invention to provide a new and improved piston for a cylinder device which obviates the above-mentioned prior art drawbacks.

It is another object of the present invention to provide a new and improved piston for a cylinder device wherein it is not necessary that a plug is completely removed.

In accordance with the present invention, a piston for a cylinder device is provided which is formed of fiber glass strengthened resinous material and includes a concave portion on an end surface thereof where a plug may remain.

BRIEF DESCRIPTION OF THE DRAWINGS

Various other objects, features and attendant advantages of the present invention will be more fully appreciated as the same becomes better understood from the following detailed description when considered in connection with the accompanying drawings wherein.

DETAILED DESCRIPTION OF THE PREFERRED EMBODIMENTS

Figure 1:
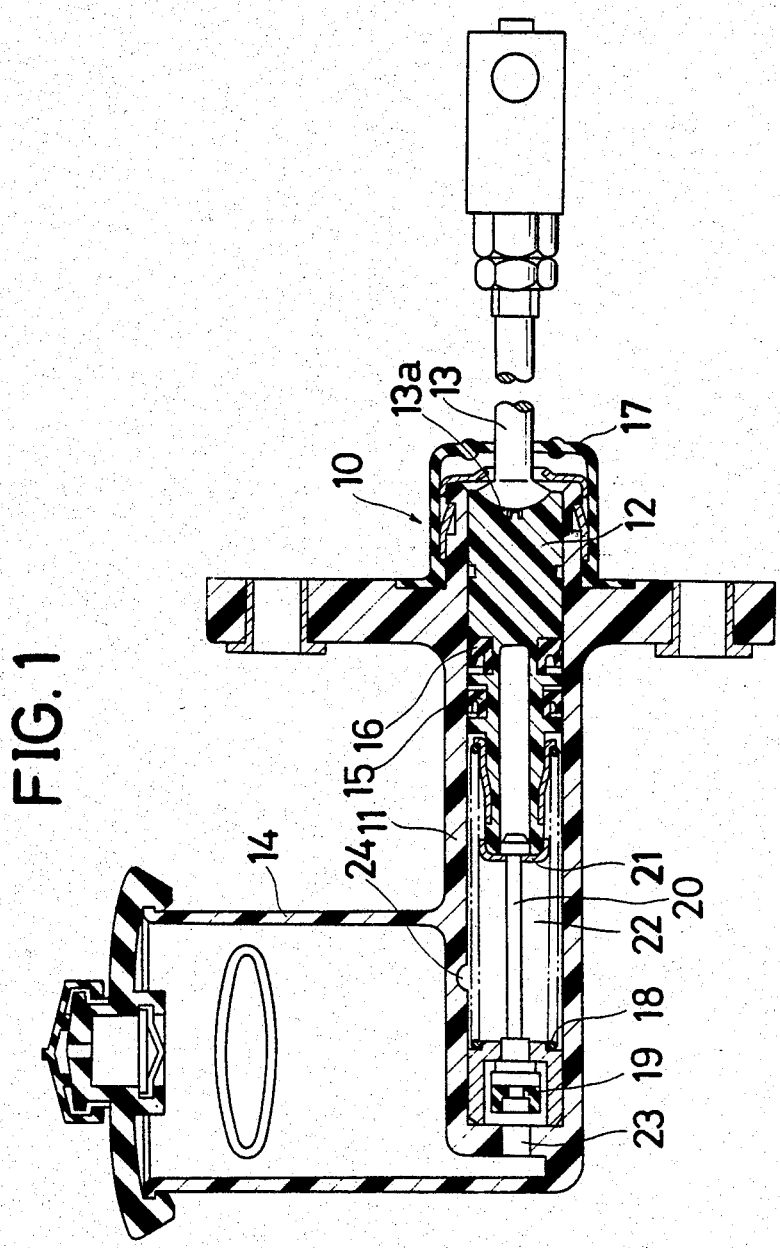
FIG. 1 is a cross sectional view of a clutch master cylinder in which a piston for a cylinder device according to the present invention is incorporated.
Figure 2:
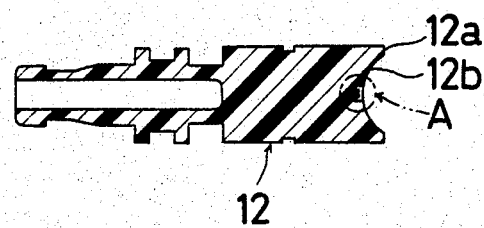
FIG. 2 is a cross sectional view of the piston of FIG. 1.
Figure 3:
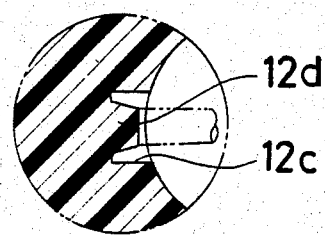
FIG. 3 is an enlarged view of part A of FIG. 2.

In FIGS. 1 to 3 showing an embodiment of the present invention, a clutch master cylinder 10 for vehicles has a cylinder body 11 and a reservoir tank 14 which are made of fiber glass nylon material as strengthened resinous material and are molded as a single body. A piston 12 is made of the same of material as that of the body 11 and is slidably received within the body 11 through means of sealing cups 15 and 16. The piston 12 has on a right end 12a thereof a concave surface 12b which receives a left end convex surface 13a of a push rod 13. Therefore, the piston 12 is operated by means of the push rod 13 which extends outside of a sealing boot 17 and is in association with a pedal (not shown). The piston 12 is urged by means of a spring 18 to the right so that a valve member 19 is normally maintained, by means of a rod 20 which is limited by a stopper 21 mounted on the piston 12, in its opening position where the reservoir tank 14 is in fluid communication with a pressure chamber 22 through means of a passage 23. When the pedal is depressed, the piston 12 is caused to be moved to the left and, therefore, the engagement between the rod 20 and the stopper 21 is released. Thus, the valve member 19 is moved by means of the spring 18 in a position where the passage 23 is closed and the fluid within the pressure chamber 22 is pressurized in response to the leftward movement of the piston 12. The pressurized fluid now prevails at an outlet port 24. When the pedal is released, the piston 12 and the valve member 19 are returned to their original positions by means of the spring 18.

As best seen in FIG. 3, a circular concave portion 12c is formed on approximately the center of the right end 12a of the piston 12 and a remaining part 12d of a plug projects from the bottom of the concave piston 12c. After molding of the piston 12, the plug projects as shown by the double dotted chain line in FIG. 3, however, this plug is easily broken within the concave portion 12c by applying the bending load. Namely, the plug may be broken by being bent vertically in FIG. 3 with a finger or nail and the part 12d of conical shape in cross section remains after removal work. Therefore, it is not necessary that the surface of the piston 12 be smoothly finished by machining. Since the concave portion 12c is formed on the concave surface 12b which receives the convex surface of the push rod 13, the concave portion 12c may function as collector of the lubricating grease for the engaging portion between the piston 12 and the push rod 13. Furthermore, since the plug remains on the center of the concave surface 12b of the piston 12, the flow of the resinous material in molding will improve and the accuracy of the dimensions of the piston 12 will be improved.

Figure 4:
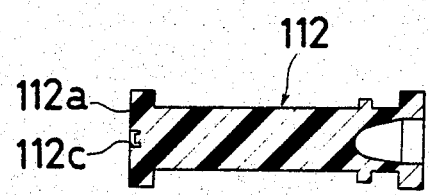
FIG. 4 is a view similar to FIG. 2, but showing a modification of the present invention.

In FIG. 4 showing a modification of the present invention, a piston 112 may be positioned within a master cylinder which is generally referred to as a Lockheed type. A circular concave portion 112c for a plug is formed on an approximately center of an inner flat surface 112a of the piston 112. If an outer surface of the piston 112 is flat, the circular concave portion 112c may be formed on the outer surface of the piston.

While preferred embodiments of the invention have been described, it will be readily apparent to those skilled in the art that various changes and arrangements can be made to accomplish the objects of the invention without departing from the scope and spirit of the appended claims.

What is claimed as new and desired to be secured by letters patent of the United States is:

1. A piston assembly for a cylinder device, comprising:

a piston formed of fiberglass strengthened resinous material, said piston having a concave surface formed at one axial end thereof and said concave surface including a concave portion which defines a remaining portion wherein said remaining portion is recessed from said concave surface.

2. A piston assembly for a cylinder device as set forth in claim 1, wherein said concave portion is formed on an approximately center portion of said concave surface of said piston.

3. A piston assembly for a cylinder device as set forth in claim 1, wherein said concave portion is of circular configuration.

* * * * *